UNITED STATES PATENT OFFICE.

MOSE WILBUSCHEWITSCH, OF NISCHNINOVGOROD, KANAVINO, RUSSIA.

PROCESS OF REFINING HYDROGENIZED FATS FOR PRODUCING EDIBLE FATS.

1,177,911. Specification of Letters Patent. Patented Apr. 4, 1916.

Application filed September 29, 1911. Serial No. 651,924.

*To all whom it may concern:*

Be it known that I, MOSE WILBUSCHE-WITSCH, a subject of the Russian Emperor, and resident of Nischninovgorod, Kanavino, Russia, have invented certain new and useful Improvements in Processes of Refining Hydrogenized Fats for Producing Edible Fats; and I do hereby declare the following to be a full, clear, and exact description of the invention, such as will enable others skilled in the art to which it appertains to make and use the same.

The invention relates to a process of refining hydrogenized fats for producing edible fats and consists in saponifying the free acids thereof while carefully avoiding any excess of water and removing the vaporizable substances and cooling the substances within vacuum chambers and in a carbonic acid atmosphere, whereby the soaps are perfectly split off and any further decomposition of the fats is avoided.

In the accompanying drawings suitable apparatus for carrying out the process is shown by way of example.

Figure 1:
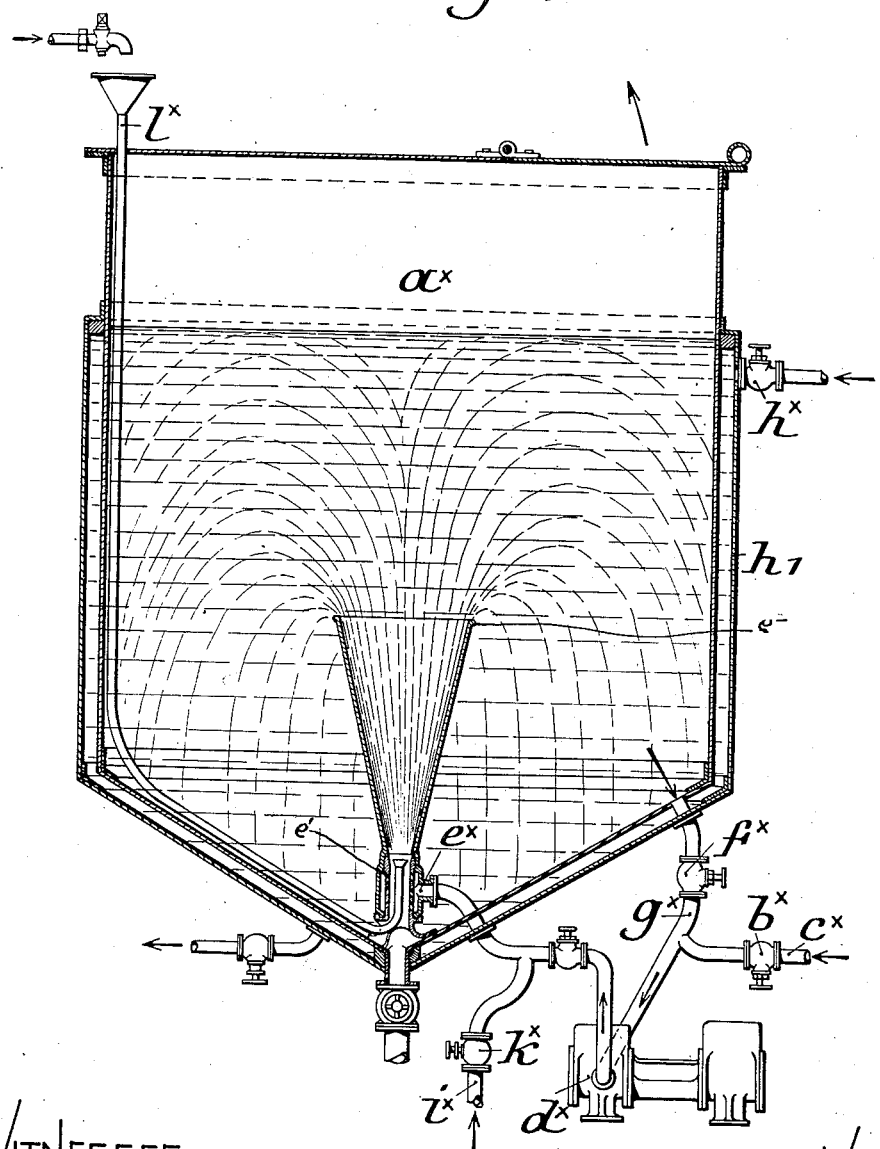
Figure 2:
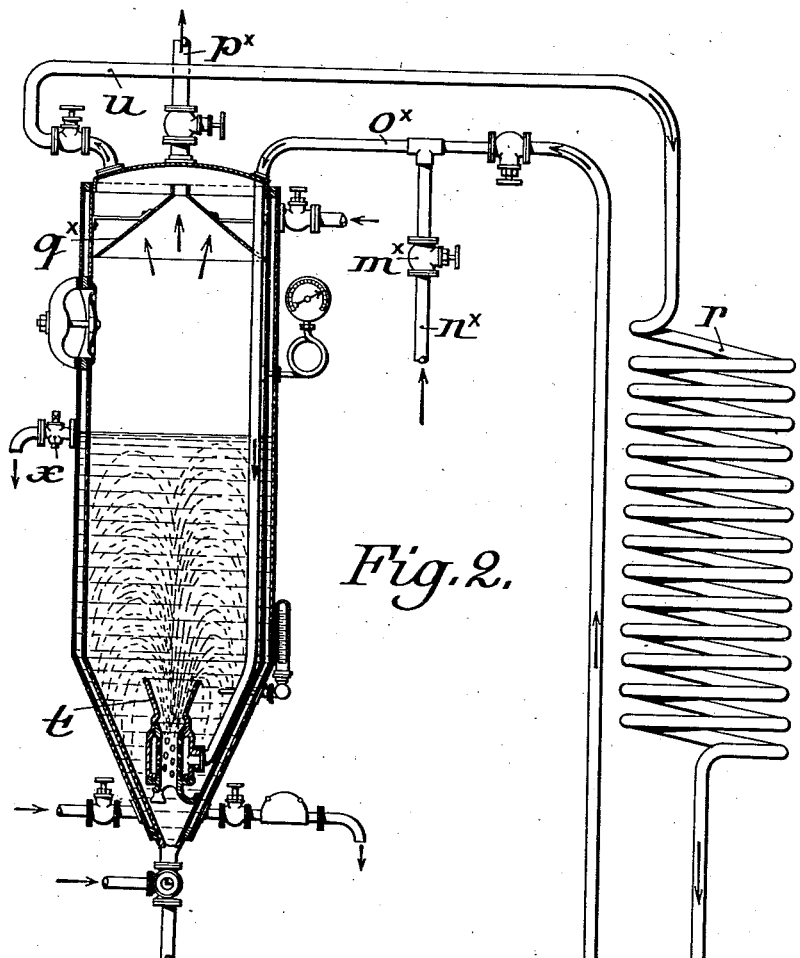

Figure 1 is a vertical section of the saponifying apparatus and Fig. 2 is a side view partly in section of the vacuum chamber for refining.

In the preferred form my improved process is carried out in the following way: In the process any desired or preferred fat, oil, fish oil, or blubber is used as a raw material, and the said raw material is hydrogenized until it has a fusing point of about 28 to 35 degrees centigrade. After the amount of acid within the fat has been determined, which is preferably done by titration, the fat is supplied to a saponifying receptacle $a^x$ which at its conical bottom is preferably provided with an injection apparatus for the fat or oil and which consists essentially of an annular chamber; the inner wall of the chamber being formed of a cylindrical tube open at each end and provided with conical, helically arranged perforations $e^1$ which are inclined upward at an acute angle to the axis of the tube and a funnel-shaped discharge-tube $e^2$. Preferably the fat is forced into the said receptacle from an oil conduit $c^x$ provided with a valve $b^x$ and by means of a pump $d^x$ and a pipe $e^x$, or it is directly poured into the receptacle from the top thereof. Thereupon the said fat is heated to about 40 degrees centigrade by means of indirect steam supplied to a steam jacket $h^1$ through a valve $h^x$, and so much of a solution of soda supersaturated at a temperature of 33 degrees centigrade is added through a pipe $l^x$ or simply from the top of the receptacle, that about 90 percentage of the free fat acid contained in the oil are neutralized. Thereupon the mixture is thoroughly intermingled, preferably by supplying oil and soda to the pump $d^x$ through the cock $f^x$ of a conduit $g^x$ and forcing the same back into the receptacle $a^x$. In this manner the oil and soda are thoroughly mixed. Thereupon an amount of very concentrated caustic soda-lye of 40° Bé., which is preferably in excess over the amount sufficient to neutralize the remainder of the free acid, the preferable amount of said caustic soda lye having a ratio to the amount of soda previously used equal to that of the molecular weights of these two substances is added. The excess of caustic soda-lye effects very little further decomposition of the fats or oils because there is little water present. This soda-lye is mixed with the oil in the same way, and the mixture is heated to about 90° centigrade by means of the steam jacket $h^1$. The carbonic acid which escapes during this operation carries the soap which has been formed to the top of the mixture, from which it is removed by ladling, while the pure oil is deposited on the bottom of the receptacle. The latter is washed by means of warm water which is supplied through the pipe $c^x$, while steam is simultaneously supplied to the receptacle from a steam conduit $i^x$ provided with a valve $k^x$ and through the pipe $e^x$. Washing is continued, until the wash water shows a perfectly neutral reaction. Thereupon so much sulfuric acid of 40° Bé. is added, that the waste water shows an acid reaction, whereupon the acid is washed out in the same way as the soap, until the wash water again shows an entirely neutral reaction. The whole treatment is carried out at a temperature of from 90 to 100 degrees centigrade. Thereupon the oil alone is withdrawn and supplied to a vacuum apparatus shown in Fig. 2. This apparatus is an autoclave constructed in the form of a vacuum apparatus provided at its upper part with a funnel shaped separator bell $q^x$ by means of which any oil that might be carried along is held back and preferably provided at its conical bottom with an injection-apparatus of the same construction as that shown in Fig. 1. Into the said autoclave the oil is drawn in by suction to the level of a cock $x$, whereupon any air that might be left within the apparatus is displaced by means of carbonic acid or any other suitable gas supplied through a pipe $o^x$ and an outlet opening $t$, of the injection-apparatus before described. Next the oil is heated by means of a steam jacket to about 100 degrees centigrade, in order that when forcing in superheating steam no water is formed which would again cause splitting of the substances.

Now from a conduit $n^x$ provided with a cock $m^x$ and through the pipe $o^x$ and the opening $t$ superheated steam of a temperature of about 150 degrees centigrade is admitted. Thereby oil and steam are thoroughly mixed, and the vaporizable parts of the oil, odorous substances and the like are removed through the vacuum conduit $p^x$. The oil which is carried along is held back by the separator bell $q^x$, so that it flows back into the apparatus. This treatment of the oil is continued from 5 to 20 hours, according to the nature of the oil. Thereupon the steam supply is shut off by closing the cock $m^x$, carbonic acid is again admitted through the conduit $o^x$, and the oil is cooled by means of cold water forced through the steam jacket. The carbonic acid which is not absorbed by the oil escapes through the pipe $u$ and it flows back into the conduit $o^x$ through a cooling coil $r$, and a cleansing device $s$. From the conduit $o^x$ it flows again into the apparatus. By thus treating the fat in an indifferent atmosphere any further decomposition is avoided.

The solution of soda required for saponification and which is supersaturated at a temperature of 33 degrees centigrade is preferably made by first preparing a soda solution which is saturated at a temperature of 33 degrees, and adding to the said solution so much powdered soda as to form a pulpy mass.

The process is also suitable for cleaning ordinary fats and oils. The saponifying process and the saponifying receptacle may also be used for saponifying oils and for making soaps.

I claim:

1. The process herein described of making oils or fats edible, which consists in neutralizing the greater amount of the free fatty acids with a concentrated soda solution, then adding a quantity of concentrated caustic soda-lye, of equal alkalinity with the soda solution, washing away the soaps thus formed, and then distilling off the volatile constituents in a carbonic-acid atmosphere.

2. In the art of making fats or oils edible, that step in the art which consists in treating these fats or oils with a concentrated soda solution for neutralizing the greater part of the free fatty acids, said soda solution having so much powdered soda added thereto as to form a pulpy mass, neutralizing the remainder of said free acids, and separating the pure oil.

3. The process herein described of making oils or fats edible, which consists in neutralizing substantially 90% of the free fatty acids with a concentrated soda solution, then adding a quantity of concentrated caustic soda-lye of equal alkalinity with the soda solution, washing away the soaps thus formed, and then distilling off the volatile constituents in a carbonic-acid atmosphere.

4. The process herein described of making oils or fats edible, which consists in neutralizing a substantial amount of the fatty acids with a concentrated soda solution, then adding a quantity of concentrated caustic soda lye containing an amount of caustic soda bearing a proportion to the amount of soda previously used equal to that of the molecular weights of these two substances, washing away the soaps thus formed, and then distilling off the volatile constituents in a carbonic acid atmosphere.

5. A process of making oils or fats edible, which consists in neutralizing the greater part of the free fatty acids with a concentrated soda solution, then adding sufficient concentrated caustic lye to form a substantial excess over and above the amount necessary to neutralize the remainder of the free fatty acids, washing away the soaps thus formed, and distilling off the volatile constituents.

6. In the art of making oils or fats edible, those steps in the art which consist in treating the said oils or fats with a concentrated solution of soda to neutralize the greater amount of the free fatty acids, and then treating the said oils or fats with a quantity of concentrated caustic soda-lye of equal alkalinity with the soda solution, so that the remainder of said fatty acids are neutralized, and separating the pure oil.

7. In the process of rendering oils or fats edible, those steps in the art which consist in neutralizing the greater part of the free fatty acids with a concentrated soda solution, the temperature of said fats or oils being about 40° centigrade, adding a concentrated caustic soda-lye solution of equal alkalinity with said soda-solution, and heating the mixture to substantially 90° centigrade, so that the remainder of said acids is neutralized, and separating out the pure oil.

8. In the art of rendering fats or oils edible, those steps in the art which consist in treating said fats or oils with a concentrated soda solution in sufficient quantity to neutralize the greater amount of the free fatty acids, then treating the fats or oils with a concentrated soda-lye solution of equal alkalinity with said soda solution, separating the soaps thus formed from the pure oil, and then adding sufficient acid to completely neutralize the alkalis of said fats or oils, and washing out any excess of acid.

In testimony that I claim the foregoing as my invention, I have signed my name in presence of two subscribing witnesses.

MOSE WILBUSCHEWITSCH.

Witnesses:
WOLDEMAR HAUPT,
HARRY L. WILSON.